(12) United States Patent  (10) Patent No.: US 7,775,721 B2
Gietl et al.  (45) Date of Patent: Aug. 17, 2010

(54) SEALED ROLLER BEARING

(75) Inventors: Thomas Gietl, Pegnitz (DE); Harald Peschke, Veitsbronn (DE); Andreas Bohr, Herzogenaurach (DE); Georg Goppelt, Pfofeld (DE)

(73) Assignee: Schaeffler KG, Herzogenaurach (DE)

( * ) Notice: Subject to any disclaimer, the term of this patent is extended or adjusted under 35 U.S.C. 154(b) by 898 days.

(21) Appl. No.: 11/426,429

(22) Filed: Jun. 26, 2006

(65) Prior Publication Data

US 2006/0291761 A1 Dec. 28, 2006

(30) Foreign Application Priority Data

Jun. 28, 2005 (DE) .................... 10 2005 029 936

(51) Int. Cl.
*F16C 33/78* (2006.01)
(52) U.S. Cl. .................. 384/486; 384/484; 384/478
(58) Field of Classification Search .................. 384/478, 384/484, 485, 486
See application file for complete search history.

(56) References Cited

U.S. PATENT DOCUMENTS 4,502,739 A * 3/1985 Flander ..................... 384/481

FOREIGN PATENT DOCUMENTS

| DE | 1 801 894 | 6/1970 |
| DE | 30 09 977 A1 | 9/1981 |
| DE | 103 36 341 A1 | 3/2005 |
| JP | 2003227521 | 8/2003 |
| JP | 2005054909 | 3/2005 |

* cited by examiner

*Primary Examiner*—William C Joyce
(74) *Attorney, Agent, or Firm*—Lucas & Mercanti, LLP

(57) ABSTRACT

A roller bearing which is sealed by a sealing washer that forms a rubbing seal and two gaps. As a result of positions which are spaced apart from one another in the axial direction of a pivot point and a center of mass of an elastic support part that bears the rubbing seal, the latter is loaded with an outwardly acting axial force in the event of an increased rotational speed as a result of the centrifugal force, with the result that the rubbing sealing lip is in contact with a lower force as the rotational speed increases.

5 Claims, 3 Drawing Sheets

SEALED ROLLER BEARING

FIELD OF THE INVENTION

The invention relates to a roller bearing, in particular a groove ball bearing, having a sealing washer which is installed between a bearing inner ring and a bearing outer ring, comprises a reinforcement and an elastic sealing material, and is arranged in a circumferential annular groove of one of the two bearing rings, the sealing washer having an elastic support part at its other end, from which elastic support part two sealing lips emerge which interact with an undercut which is arranged in the other bearing ring, the undercut being of asymmetrical configuration in such a way that a first shoulder which adjoins the raceway region and a second shoulder which lies on the outside are formed, which shoulders have different diameters, the axially inwardly directed first sealing lip being in rubbing contact with an inner wall of the undercut, and the second axially outwardly directed sealing lip forming a first gap seal with the shoulder which lies on the outside, and in such a way that, radially spaced apart from the first two sealing lips, a third inwardly directed sealing lip is arranged which forms a second gap seal with the first shoulder.

BACKGROUND OF THE INVENTION

A sealing concept of this type for a roller bearing has already been disclosed by JP 2003-227521 A1. FIGS. 1 and 2 of this prior publication show a groove ball bearing, in the outer ring of which a sealing washer is inserted in a circumferential annular groove. This sealing washer comprises a metallic reinforcement which is encapsulated with an elastic sealing material by injection moulding. At the end which faces away from the outer ring, this sealing washer has an elastic support part, from which two sealing lips branch off. Moreover, the sealing washer is provided with a further third sealing lip, all three sealing lips interacting with an undercut which is arranged in the inner ring. The undercut in the inner ring is of asymmetrical configuration, with the result that the inner ring has two shoulders with different diameters; firstly, a first shoulder which adjoins the raceway region directly, and secondly a second shoulder which delimits the inner ring at its axial end and has a diameter which is smaller than the diameter of the first shoulder. The three sealing lips interact with the undercut in such a way that a rubbing seal and two gap seals are realized. The rubbing seal is formed by the first sealing lip which bears against a wall of the undercut. The first gap seal is formed by the second, axially outwardly directed sealing lip which covers the shoulder which lies on the outside of the bearing inner ring, at a spacing. Finally, the second gap seal is formed by the third radially inwardly pointing sealing lip, which covers the first shoulder of the bearing inner ring which adjoins the raceway region, at a spacing.

A disadvantage of this sealing concept is, in particular, that the support part with the first two sealing lips is inclined inwards in the non-installed state, the inclination being measured against a plane which extends at right angles to the rotational axis. This inclination ensures that, in the installed state, the first sealing lip bears against the side wall of the undercut in the bearing inner ring with pretension. This has the consequence that increased friction is attained with an increasing rotational speed as a result of the constantly large pressing force of the first sealing lip against the inner wall of the undercut, which increased friction is associated with impermissibly high friction heat. This can lead to the bearing temperature being increased in an impermissible manner, which can lead to a loss of lubricant which has a direct effect on the service life of the roller bearing.

SUMMARY OF THE INVENTION

Proceeding from the disadvantages of the known prior art, the invention is based on the object of providing a seal for a roller bearing, with which the rubbing sealing lip can be pretensioned as a function of the rotational speed.

According to the invention, this object is achieved in that, a sealing washer installed between a bearing inner ring and a bearing outer ring and is arranged in a circumferential annular groove of a first of the two bearing rings, the sealing washer having a reinforcement sealing material and an elastic support part at end opposite the annular groove, the elastic support part comprising a foot, a first sealing lip and a second sealing lip protruding from the foot and interacting with an undercut arranged in a second of the two bearing rings, the undercut being of asymmetrical configuration such a way a first shoulder, which adjoins a raceway region, and a second shoulder, which lies opposite the first shoulder, have different diameters, the first sealing lip is directed axially inwardly and is in rubbing contact with an inner wall of the undercut, and the second sealing lip is directed axially outwardly, forming a first gap seal with the second shoulder, and, radially spaced apart from the first sealing lip and the second sealing lip, a third inwardly directed sealing lip is arranged perpendicular to the foot forming a second gap seal with the first shoulder, in the installed state, the elastic support part is inclined inwardly in the axial direction with respect to a plane which extends at right angles to a rotational axis, a pivot point A and a center of mass S of the elastic support part, which center of mass S is arranged radially spaced apart from the latter, being arranged offset outwardly in the axial direction with respect to one another by an amount "a", with the result that, when the roller bearing rotates, a centrifugal force which acts in the center of mass S triggers a force component which acts in the axial direction outwardly on the first rubbing sealing lip.

The above-described embodiment of the sealing washer therefore makes it possible to support the first sealing lip on the wall of the undercut in a pretensioned manner which is regulated by the centrifugal force. As a result of the inclination of the support part inwards and as a result of the axial offset of the pivot point A and the centre of mass S, the pressing force between the first sealing lip and the undercut falls as the centrifugal force is increased by rotation. As a result, the bearing is not heated excessively, even at high rotational speeds, as a result of the lower friction, which has a positive effect on the lubricant supply and therefore on the entire service life of the roller bearing. The first sealing lip is attached to the elastic support part in a flexurally soft manner and lies under slight pretension, the flexural rigidity of the sealing lip being designed in such a way that, over the entire rotational-speed range of the bearing, optimum sealing-lip contact is ensured.

Further advantageous refinements of the invention are described below.

For instance, a radial spacing of the first sealing lip from the pivot point A and a thickness t of the support part form the following relationship:

$$3 \leq l/t \leq 6.$$

This ratio of the length of the lever arm of the first sealing lip to the width of the support part defines the rigidity of the latter, the sealing lip being relieved to a more pronounced extent at the same rotational speed of the bearing as the ratio increases.

It is apparent that the radial spacing and the axial amount "a" form the following relationship:

$$10 \leq l/a \leq 150.$$

As a result of this ratio, the mutual effect of the contact force and the centrifugal force is controlled at the respective points of action. This means that the rubbing sealing lip lifts off more readily from the undercut edge at the same bearing rotational speed as the ratio becomes greater.

According to a further feature there is an axial spacing k between the center of mass S and the end of the second sealing lip and the axial spacing m between the center of mass S and the end of the first sealing lip to form the following relationship:

$$1 < k/m < 180.$$

The influence of the centrifugal force is increased at the same bearing rotational speed as the ratio increases, which means that the rubbing sealing lip lifts off more readily. The design of the seal is configured in such a way with the aid of the abovementioned relationships that, even at the maximum rotational speed, the first rubbing sealing lip which acts as a dynamic sealing lip is still in contact. This results in the already favourable properties with regard to the development of temperature and the level of the friction forces on the sealing lip, which is in a direct relationship with the wear behaviour.

According to a further feature of the invention the reinforcement of disc-shaped configuration of the sealing washer is surrounded at least on one side by the elastic sealing material, and the reinforcement has an angled-away flange at one end and a limb which is inclined obliquely in the direction of the undercut at the other end. This structural configuration of the sealing washer ensures its sufficient strength and rigidity.

Finally, according to a last feature of the invention, the roller bearing, which is sealed according to the invention, is used in a tensioning roller or a deflection roller of a tensioning system, with which a drawing means of a flexible drive is pretensioned. Rollers of this type are subjected to very high loads, and satisfactory functioning of the seal is also required under very difficult conditions, in particular in vehicles with a fording capability.

The invention will be explained in greater detail using the following exemplary embodiment.

BRIEF DESCRIPTION OF THE DRAWINGS

The present invention will be further understood and appreciated by reading the following description in conjunction with the accompanying drawings, in which.

DETAILED DESCRIPTION OF THE DRAWINGS

Figure 1:
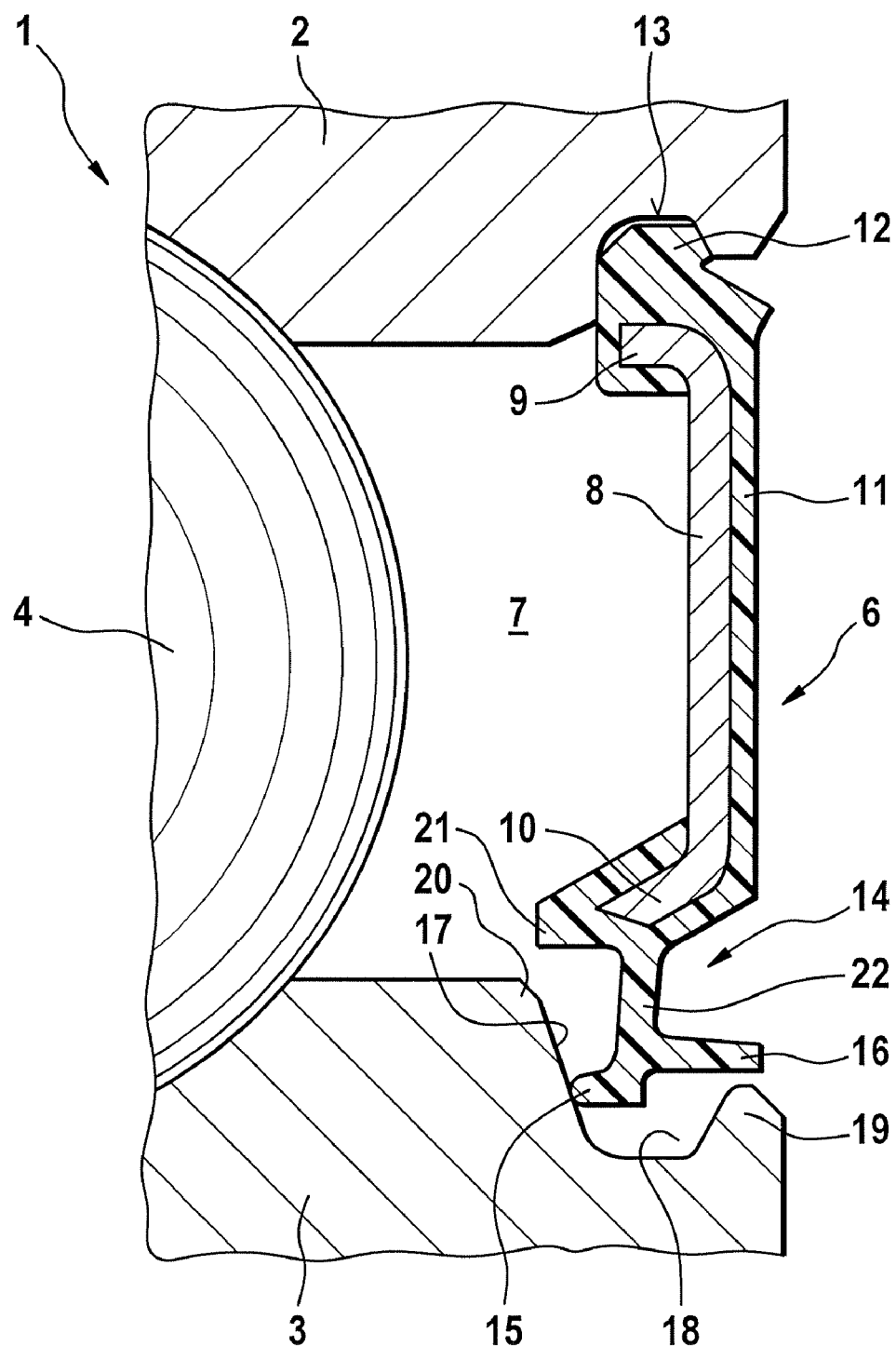
FIG. 1 shows a partial longitudinal section through a groove ball bearing having a seal according to the invention.

FIG. 1 shows a roller bearing 1 which is configured as a groove ball bearing, between the bearing outer ring 2 of which and the bearing inner ring 1 of which rolling bodies 4 which are configured as balls roll on raceways (not denoted in greater detail), which rolling bodies 4 are guided in a cage (not shown). The space 7 which accommodates the rolling bodies 4 and lies between the two bearing rings 2 and 3 is sealed with respect to the outside by the sealing washer 6. The latter comprises the reinforcement 8, which has the radially inwardly angled-away flange 9 at the upper end and the limb 10 which is inclined obliquely in the direction of the undercut 18 at the lower end, and the elastic sealing material 11. At the upper end, the sealing material 11 has the thickened portion 12, with which the sealing washer 6 is inserted in the bearing outer ring 2 in the circumferential annular groove 13 with a form-fitting and/or force-transmitting connection. This means that the bearing outer ring 2 rotates about the bearing axis 5 in the present exemplary embodiment, while the bearing inner ring 3 is arranged in a stationary manner. This situation occurs when the bearing outer ring 2 of the roller bearing 1 is provided with a pulley wheel (not shown) which forms the running surface for a belt of a flexible drive.

At the lower end, the pulley wheel 6 has an elastic support part 14, from which two sealing lips 15, 16 branch off; firstly the rubbing sealing lip 15 which bears against a wall 17 of the undercut 18, and secondly the second sealing lip 16 which forms a first gap seal with the second shoulder 19. The undercut 18 is configured in the bearing inner ring 3 in such a way that the first shoulder 20 which is arranged on the left and adjoins the raceway of the rolling bodies 4 has a greater diameter than the second shoulder 19. There is a third sealing lip 21 above the sealing lips 15, 16, which third sealing lip 21 is directed inwards in the radial direction and forms a second gap seal with the first shoulder 20. Within the context of the invention, the third sealing lip 21 is no longer to be associated with the elastic support part 14. As FIG. 1 further shows, the roller bearing 1 is protected in a very satisfactory manner by the sealing washer 6 with its total of three seals. The second gap seal between the first shoulder 20 and the third sealing lip 21 ensures, in particular, that grease which is thrown off by the rolling bodies 4 is guided back again. The first gap seal which is formed by the second sealing lip 16 and the second shoulder 19 ensures that moisture which penetrates from the outside or dirt which penetrates can pass as far as the rubbing seal only in a very small amount, which rubbing seal is formed by the first sealing lip 15 and the wall 17 of the undercut 18.

In the following text, the method of operation of the seal according to the invention will be explained, reference being made, in particular, to FIG. 2 in order to clarify the terms used.

That part which is arranged in the radial direction below the third sealing lip 21 is to be understood as the elastic support part 14 of the sealing washer 6. The elastic support part 14 comprises the foot 22 which is arranged in an inclined manner in the axial direction inwards by the angle α with respect to a plane E which is arranged perpendicularly with respect to the rotational axis 5. On the left-hand side, the first rubbing sealing lip 15 adjoins the lower end of the foot 22, while on the right-hand side, offset upwards somewhat in the radial direction, the radially outwardly pointing second sealing lip 16 is integrally formed.

A denotes the position of the pivot point of the elastic support part 14, which pivot point is produced during rotation of the bearing outer ring 2. S indicates the position of the centre of mass which is formed by the elastic support part 14. The diameter D1 indicates the diameter of the support part 14, the reference point of the said diameter D1 being the pivot point A. D2 indicates the diameter of the contact point of the first sealing lip 15 which bears against the inner wall 17 of the undercut 18. D3 denotes the internal diameter of the first sealing lip 15, while D4 indicates the position of the diameter of the centre of mass S. l indicates the radial spacing between the pivot point A of the elastic support part 14 and the contact point of the sealing lip 15. t defines the thickness of the elastic support part 14, to be precise the thickness of its foot 22. The axial section between the pivot point A and the centre of mass S of the support part 14 is identified by the amount a. Finally, m and k indicate the axial length of the sealing lip 15 and of the sealing lip 16, respectively, the reference point in each case being the centre of mass S of the support part 14.

Figure 2:
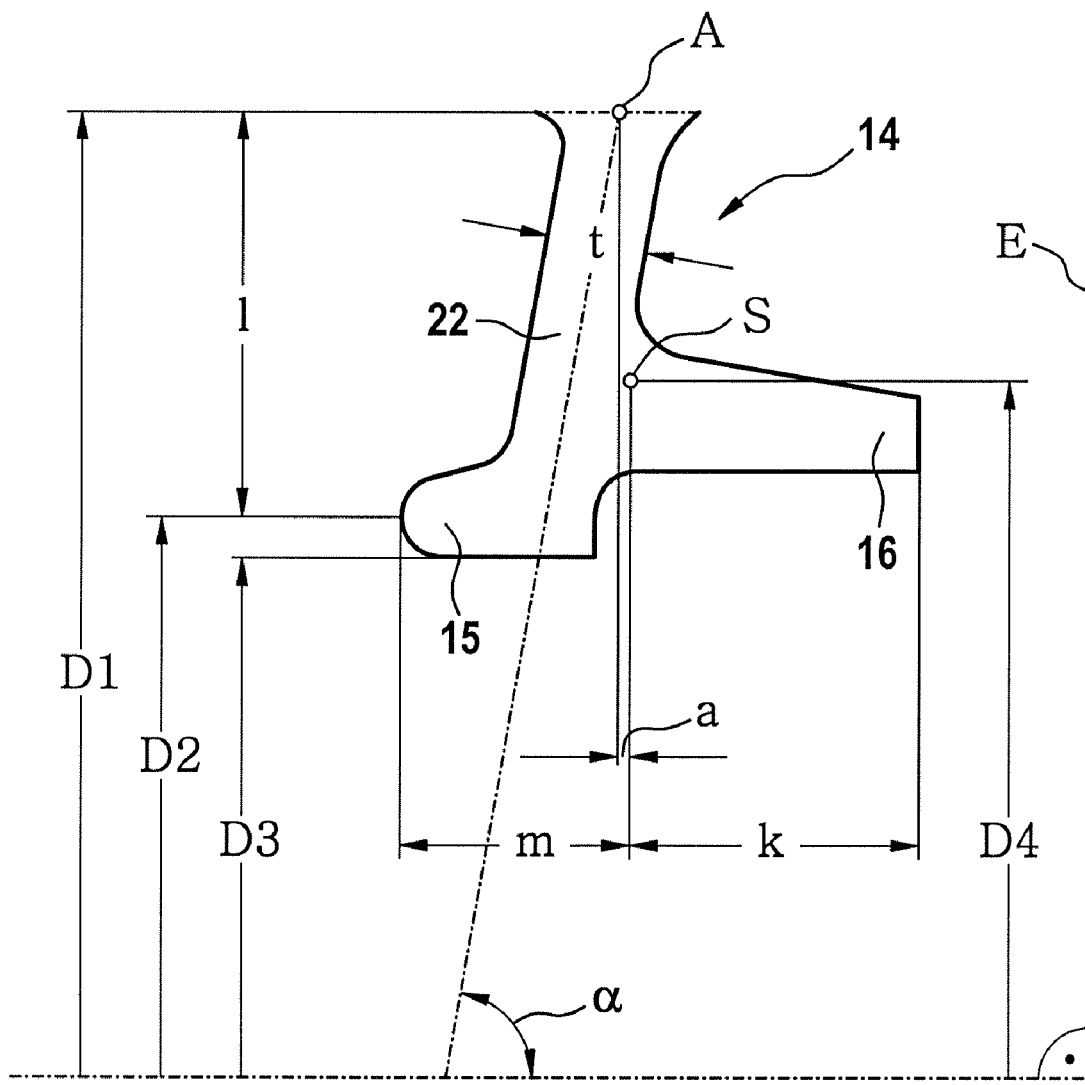
FIG. 2 shows an enlarged side view of an elastic support part.

As can be seen from FIGS. 1 and 2, the centre of mass S of the elastic support part 14 is situated spaced apart from its pivot point A in the radial direction and offset outwardly by the amount a in the axial direction. This spacing a is increased in the installation position and is directly dependent on the angle α which is assumed by the support part 14 after assembly with respect to the rotational axis 5. The magnitude of the pressing force of the rubbing sealing lip 15 against the wall 17 under the influence of centrifugal force is controlled by the position of the centre of mass S with respect to the pivot point A, which position is changed in the installation state. When the rotational speed of the roller bearing 1 increases, that is to say in the case of a rotating bearing outer ring 2 and a sealing washer 6 which is connected to the latter, a force component which is generated by the centrifugal force acts outwardly in the axial direction, which force component gradually reduces the pressing force of the first sealing lip 15. This ensures that the pressing force on the rubbing first sealing lip 15 decreases as the rotational speed increases, with the result that its friction is reduced, which brings about the above-described advantages for this bearing. Accordingly, the first rubbing sealing lip 15 is controlled dynamically by the influence of centrifugal force, the seal being designed in such a way that, even at the maximum rotational speed, the sealing lip 15 is still in contact, but with a small pressing force.

Figure 3:
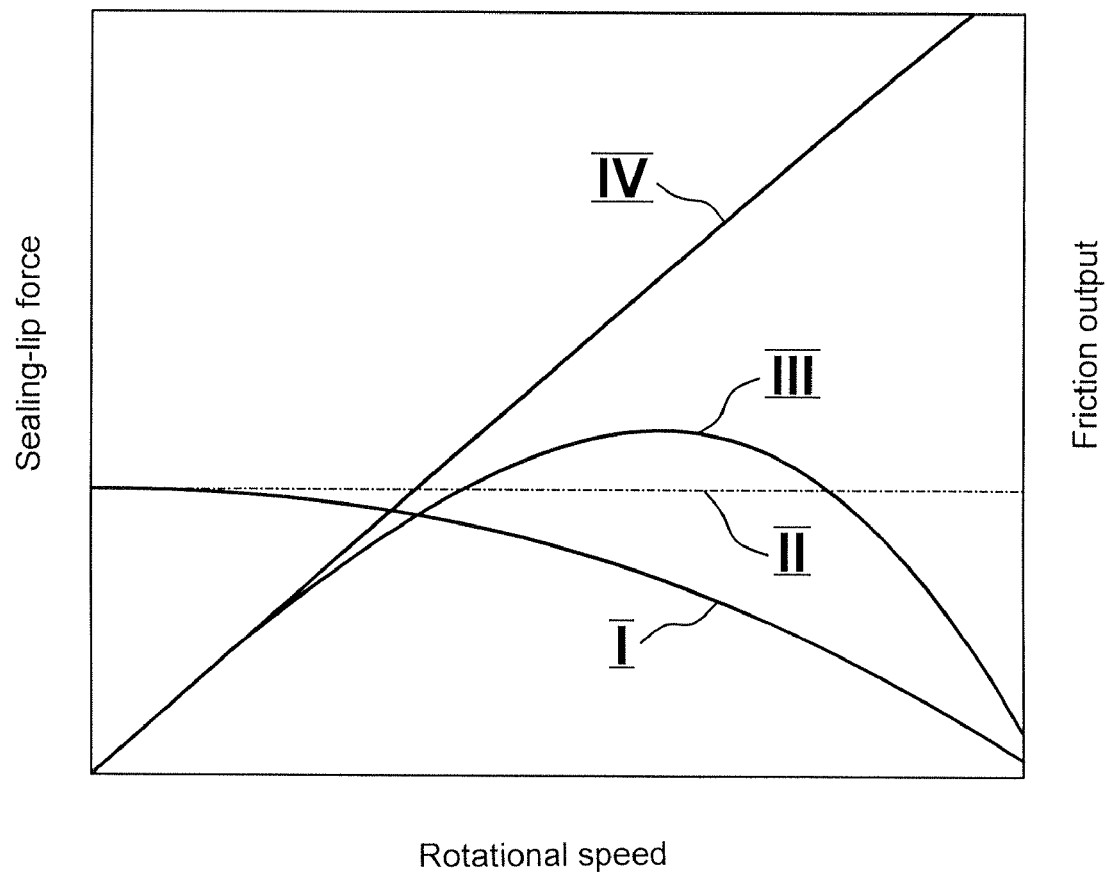
FIG. 3 shows a graphic illustration of properties of the rubbing sealing lip as a function of the rotational speed.

FIG. 3 shows a graphic representation of the relationships between the sealing-lip force and the friction when either the bearing outer ring 2 or the bearing inner ring 3 rotates in the roller bearing 1 which is shown in FIG. 1 with a sealing washer which is arranged in the bearing outer ring 2. The curve which is denoted by I shows the force which acts on the sealing lip 15 when the bearing outer ring 2 rotates. It can be seen that this force is reduced as the rotational speed is increased, as a force which acts in the axial direction acts on the sealing lip 15 as a result of the centrifugal force. The curve II shows the same force which acts on the sealing lip 15 when the bearing inner ring 3 rotates. It can be seen that the force remains constant in this case, because there is no influence of centrifugal force. The curve III shows the friction output of the seal when the bearing outer ring 2 rotates. It can be seen that the friction output rises initially as the rotational speed rises, but then falls again because the force which lifts off the sealing lip 15 in an axial direction outwards increases with the rotation. Finally, the curve which is denoted by IV shows that the friction output also increases as the rotational speed rises in the case of a rotating bearing inner ring 3.

LIST OF REFERENCE NUMERALS

1 Roller bearing
2 Bearing outer ring
3 Bearing inner ring
4 Rolling body
5 Rotational axis
6 Sealing washer
7 Space
8 Reinforcement
9 Flange
10 Limb
11 Sealing material
12 Thickened portion
13 Annular groove
14 Elastic support part
15 First sealing lip
16 Second sealing lip
17 Wall
18 Undercut
19 Second shoulder
20 First shoulder
21 Third sealing lip
22 Foot
A Position of the pivot point of the support part 14
S Position of the centre of mass of the support part 14
D1 Diameter of the support part 14
D2 Diameter of the contact point of the sealing lip 15
D3 Internal diameter of the sealing lip 15
D4 Position of the external diameter of the centre of gravity S
l Radial spacing between the pivot point A and the contact point of the sealing lip 15
t Thickness of the support part 14
a Axial spacing between the pivot point A of the support part 14 and its centre of mass S
m Axial length of the sealing lip 15 in relation to the centre of mass S
k Axial length of the sealing lip 17 in relation to the centre of mass S
Curve I Sealing-lip force with a rotating bearing outer ring 2
Curve II Sealing-lip force with a rotating bearing inner ring 3
Curve III Friction output with a rotating bearing outer ring 2
Curve IV Friction output with a rotating bearing inner ring 3
E Plane

The invention claimed is:

1. A roller bearing, comprising:
a sealing washer installed between a bearing inner ring and a bearing outer ring, the sealing washer having a thickened portion, which has two chamfered faces, arranged predominately in a circumferential annular groove of a first of the two bearing rings, contacting only two faces of the annular groove and forming a gap between the thickened portion and the annular groove, and the thickened portion having a rounded undercut starting at an end of one of the chamfered faces, the sealing washer having a reinforcement, an elastic sealing material and an elastic support part at an end opposite the annular groove, the elastic support part comprising a foot, a first sealing lip and a second sealing lip protruding from the foot and interacting with an undercut arranged in a second of the two bearing rings, the undercut being of asymmetrical configuration in such a way that a first shoulder, which adjoins a raceway region, and a second shoulder, which lies opposite the first shoulder, have different diameters, the first sealing lip is directed axially inwardly and is in rubbing contact only with an inner wall of the undercut, and the second sealing lip, which is predominately rectangular, is directed axially outwardly, forming a first gap seal with the second shoulder, and, radially spaced apart from the first sealing lip and the second sealing lip, a third inwardly directed sealing lip is arranged parallel to a rotational axis and perpendicular to the foot forming a second gap seal with the first shoulder,
wherein, in an installed state, the elastic support part is inclined inwardly in an axial direction with respect to a plane, which extends at right angles, to the rotational axis, a pivot point and a center of mass of the elastic support part, which is arranged radially spaced apart from the latter, being arranged offset outwardly in the axial direction with respect to one another by an axial amount, with a result that, when a roller bearing rotates, a centrifugal force, which acts in the center of mass, triggers a force component, which acts in the axial direction outwardly on the first sealing lip.

2. The roller bearing of claim 1, wherein a radial spacing of the first sealing lip from the pivot point and a thickness of the support part form the following relationship:

$3 = l/t = 6$.

3. The roller bearing of claim 1, wherein the radial spacing and the axial amount form the following relationship:

$10 < l/a < 150$.

4. The roller bearing of claim 1, wherein an axial spacing between the center of mass and the end of the second sealing lip and an axial spacing between the center of mass and the end of the first sealing lip form the following relationship:

$1 < k/m < 180$.

5. The roller bearing of claim 1, wherein the reinforcement of disc-shaped configuration of the sealing washer is surrounded at least on one side by the elastic sealing material, and the reinforcement has an angled-away flange at one end and a limb which is inclined obliquely in the direction of the undercut at the other end.

* * * * *